(12) United States Patent
Mei et al.

(10) Patent No.: US 12,537,558 B2
(45) Date of Patent: Jan. 27, 2026

(54) TIME DOMAIN ORTHOGONAL COVER CODING WITH FREQUENCY HOPPING

(71) Applicant: ZTE Corporation, Guangdong (CN)

(72) Inventors: Meng Mei, Shenzhen (CN); Bo Gao, Shenzhen (CN); Shujuan Zhang, Shenzhen (CN); Ke Yao, Shenzhen (CN); Yang Zhang, Shenzhen (CN)

(73) Assignee: ZTE Corporation, Guangdong (CN)

( * ) Notice: Subject to any disclaimer, the term of this patent is extended or adjusted under 35 U.S.C. 154(b) by 164 days.

(21) Appl. No.: 18/521,637

(22) Filed: Nov. 28, 2023

(65) Prior Publication Data

US 2024/0106492 A1    Mar. 28, 2024

Related U.S. Application Data

(63) Continuation of application No. PCT/CN2022/110693, filed on Aug. 5, 2022.

(51) Int. Cl.
*H04B 1/713* (2011.01)
*H04L 27/26* (2006.01)

(52) U.S. Cl.
CPC ....... *H04B 1/713* (2013.01); *H04L 27/26035* (2021.01); *H04L 27/2613* (2013.01)

(58) Field of Classification Search
CPC .............. H04B 1/713; H04L 27/26035; H04L 27/2613; H04L 5/0012; H04L 5/0016; H04L 5/0051
USPC .................................................. 375/133, 340
See application file for complete search history.

(56) References Cited

U.S. PATENT DOCUMENTS

| | | | |
|---|---|---|---|
| 2014/0078972 A1* | 3/2014 | Sorrentino | H04L 5/0048 370/329 |
| 2018/0124815 A1* | 5/2018 | Papasakellariou | H04W 72/1268 |
| 2019/0222389 A1* | 7/2019 | Ko | H04L 1/0026 |
| 2020/0052841 A1* | 2/2020 | Takeda | H04L 5/0051 |
| 2020/0288487 A1* | 9/2020 | Liu | H04W 72/23 |
| 2020/0288506 A1* | 9/2020 | Lei | H04W 74/0833 |

(Continued)

FOREIGN PATENT DOCUMENTS

| | | |
|---|---|---|
| CN | 102123014 A | 7/2011 |
| CN | 113422676 A | 9/2021 |

(Continued)

OTHER PUBLICATIONS

International Search Report for International Application No. PCT/CN2022/110693, Mail Date: Jan. 3, 2023. 9 pages.

(Continued)

*Primary Examiner* — Emmanuel Bayard
(74) *Attorney, Agent, or Firm* — Perkins Coie LLP

(57) ABSTRACT

Methods, apparatus, and systems that enable Time Domain (TD) Orthogonal Cover Coding (OCC) on non-consecutive Orthogonal Frequency Division Multiplexing (OFDM) symbols with frequency hopping are disclosed. In one example aspect, a method for wireless communication includes configuring, by a base station, multiple frequency-domain hops for a communication from a terminal device and receiving, by the base station, the communication from the terminal device. TD-OCC is selectively applied, based on a characteristic of a Demodulation Reference Signal (DMRS), to one or more non-continuous symbols that carry the DMRS in at least one of the multiple frequency-domain hops.

20 Claims, 15 Drawing Sheets

(56) References Cited

U.S. PATENT DOCUMENTS

| | | | | |
|---|---|---|---|---|
| 2021/0368495 A1* | 11/2021 | Matsumura | ....... | H04W 72/0446 |
| 2022/0278880 A1* | 9/2022 | Matsumura | ........... | H04J 13/004 |
| 2022/0353862 A1* | 11/2022 | Cozzo | ............... | H04W 72/0473 |
| 2023/0163912 A1* | 5/2023 | Abdelghaffar | ........ | H04L 5/0012 |
| | | | | 370/330 |
| 2025/0184077 A1* | 6/2025 | Jacobsson | ........... | H04L 27/2613 |

FOREIGN PATENT DOCUMENTS

| | | |
|---|---|---|
| CN | 117859286 A | 4/2024 |
| EP | 4009688 A1 | 6/2022 |
| WO | 2024026880 A1 | 2/2024 |

OTHER PUBLICATIONS

Huawei et al. "Long PUCCH for UCI of up to 2 bits," 3GPP TSG RAN WG1 Meeting AH_NR#3, Nagoya, Japan, Sep. 18-21, 2017, R1-1715402.

Extended European Search Report from European Patent Application No. 22942945.1 mailed May 7, 2024, 10 pages.

NTT Docomo, Inc. "Discussion on increased No. of othogonal DMRS ports," 3GPP TSG RAN WG1 #109-e e-Meeting, May 9-20, 2022, R1-2204370.

Moderator (NTT Docomo), "FL summary on DMRS," 3GPP TSG RAN WG1 #109-e e-Meeting, May 9-20, 2022, R1-2205208.

ZTE, "DMRS Enhancement for UL/DL MU-MIMO and 8 Tx UL SU-MIMO," 3GPP TSG RAN WG1 #109-e e-Meeting, May 9-20, 2022, R1-2203266.

\* cited by examiner

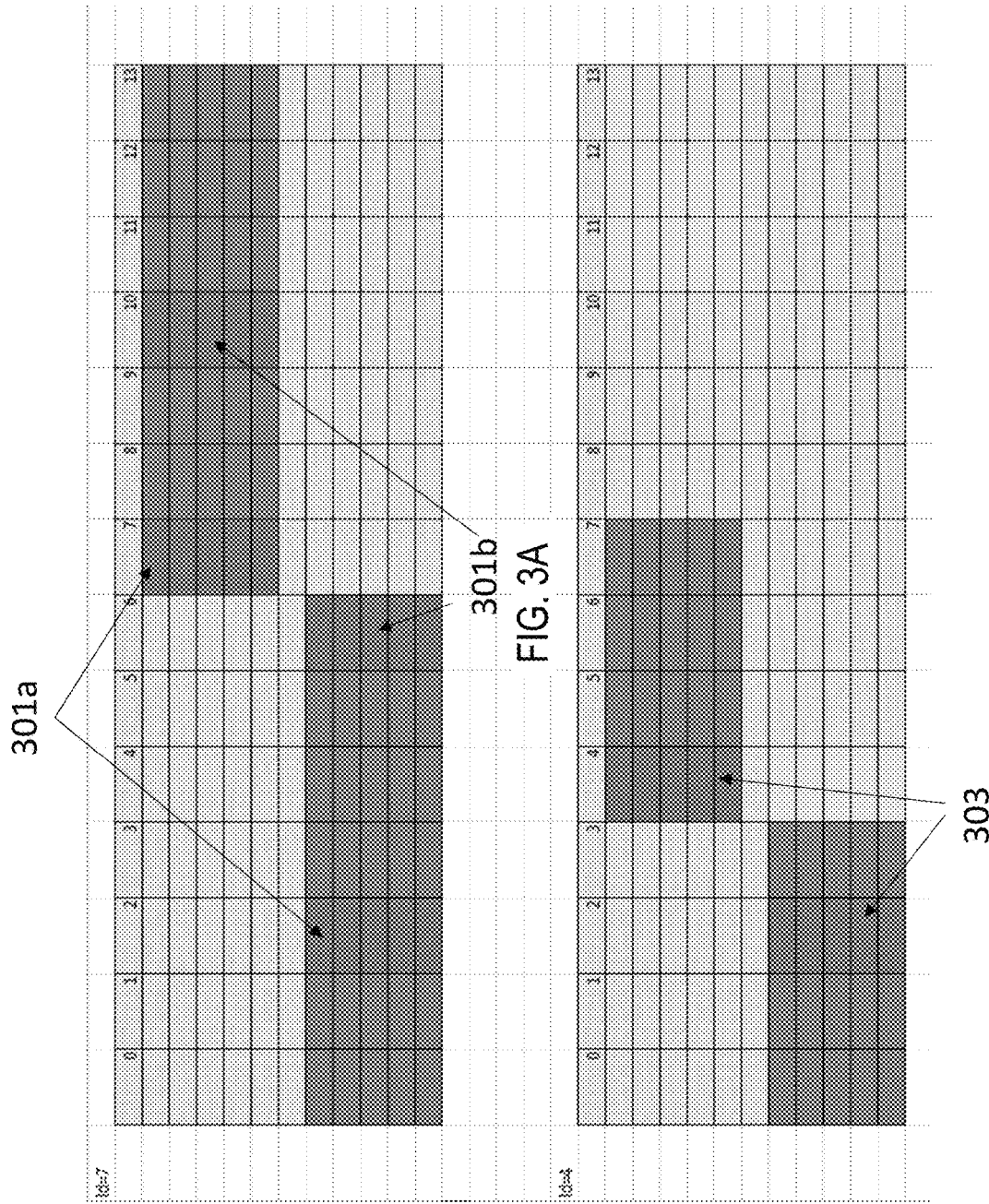

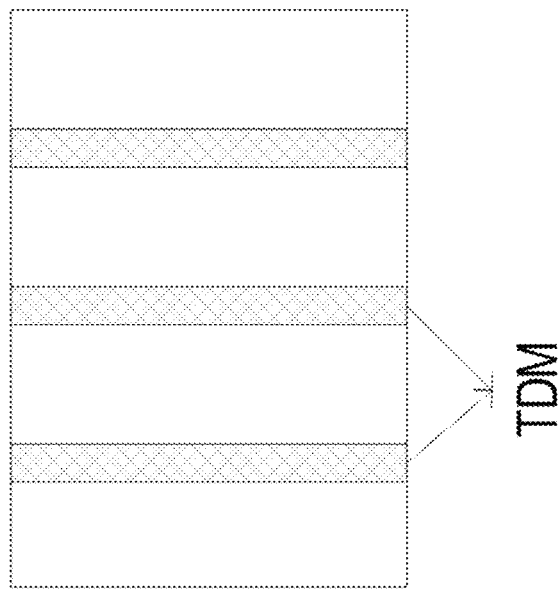
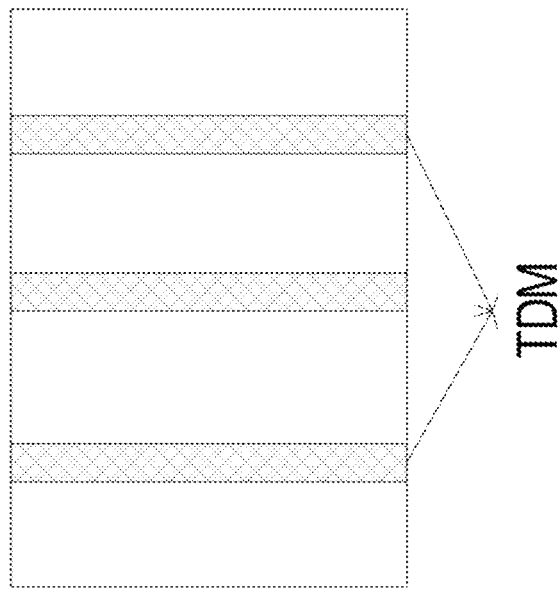
FIG. 7A

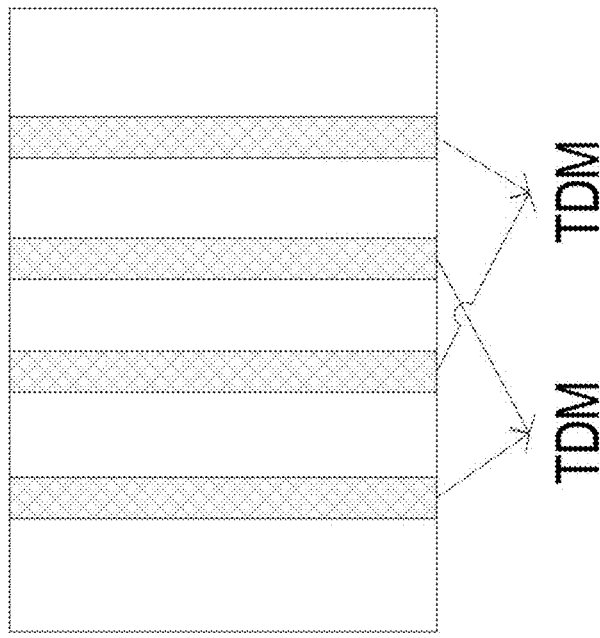
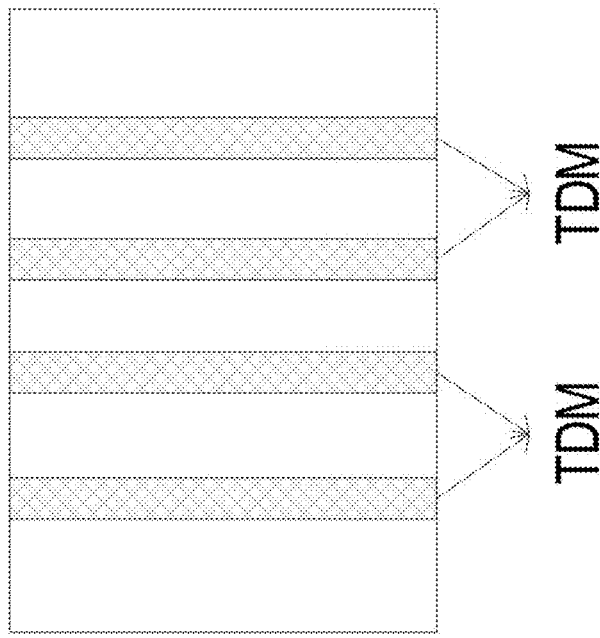
FIG. 7B

TIME DOMAIN ORTHOGONAL COVER CODING WITH FREQUENCY HOPPING

CROSS REFERENCE TO RELATED APPLICATIONS

This patent document is a continuation of and claims benefit of priority to International Patent Application No. PCT/CN2022/110693, filed on Aug. 5, 2022. The entire content of the before-mentioned patent application is incorporated by reference as part of the disclosure of this application.

TECHNICAL FIELD

This patent document is directed to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable Time Domain (TD) Orthogonal Cover Coding (OCC) on non-consecutive Orthogonal Frequency Division Multiplexing (OFDM) symbols with frequency hopping.

In one example aspect, a method for wireless communication includes configuring, by a base station, multiple frequency-domain hops for a communication from a terminal device and receiving, by the base station, the communication from the terminal device. TD-OCC is selectively applied, based on a characteristic of a Demodulation Reference Signal (DMRS), to one or more non-continuous symbols that carry the DMRS in at least one of the multiple frequency-domain hops.

In another example aspect, a method for wireless communication includes determining, by a terminal device, that multiple frequency-domain hops are configured for a communication to a base station; and transmitting, by the terminal device, the communication to the base station. Time-domain OCC is selectively applied, based on a characteristic of a DMRS, to one or more non-continuous symbols that carry the DMRS in at least one of the multiple frequency-domain hops.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 3A illustrates an example frequency hopping scenario with DMRS mapping in accordance with one or more embodiments of the present technology.

FIG. 3B illustrates another example frequency hopping scenario with DMRS mapping in accordance with one or more embodiments of the present technology.

FIG. 7A illustrates an example mapping of Time Division Multiplexing (TDM) based DMRS to Orthogonal Frequency Division Multiplexing (OFDM) symbols in accordance with one or more embodiments of the present technology.

FIG. 7B illustrates another example mapping of TDM based DMRS to OFDM symbols in accordance with one or more embodiments of the present technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1A:
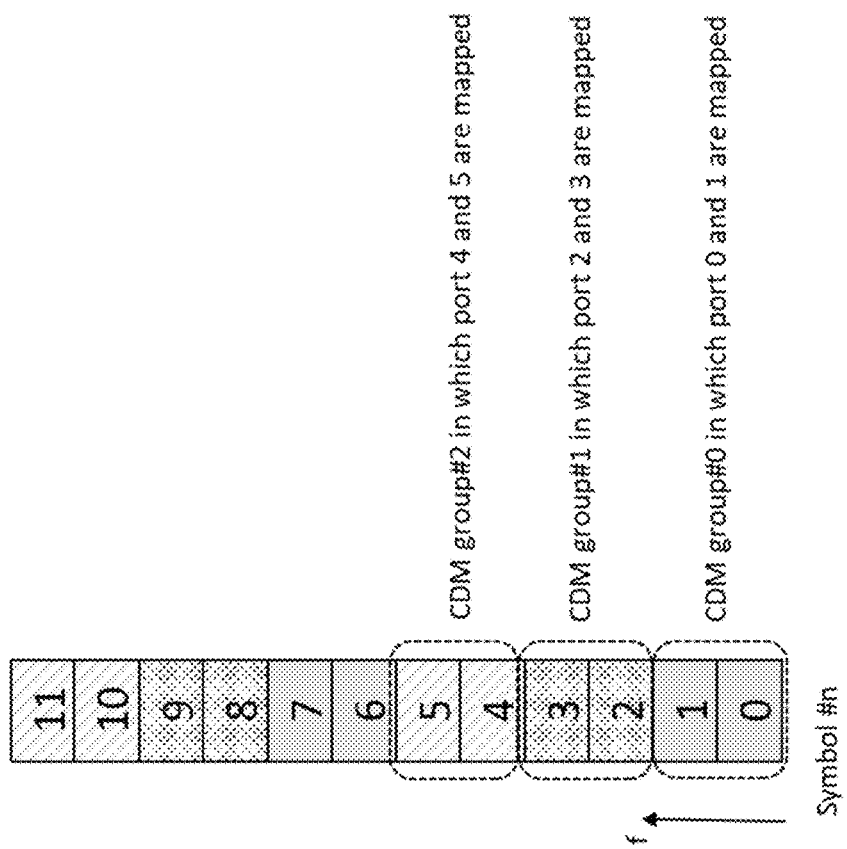
FIG. 1A illustrates an example type2 DMRS with one front-loaded Demodulation Reference Signal (DMRS) symbol.

In wireless communication systems, Demodulation Reference Signal (DMRS) is used by the receiver to perform channel estimation and demodulation of the associated channel. Currently, two types of DMRS are supported: DMRS type 1 and DMRS type 2. For type 1 DMRS, the minimum resource element group in frequency domain is one resource element (RE). For type 2 DMRS, the minimum resource element group in frequency domain is two consecutive REs. FIG. 1A illustrates an example type2 DMRS with one front-loaded DMRS symbol. One DMRS symbol (also referred to as the one front-loaded DMRS symbol) is configured by Radio Resource Control (RRC) signaling or indicated by Downlink Control Information (DCI) signaling. Two adjacent REs in the frequency domain form one DMRS Code Division Multiplexing (CDM) group. In this specific example, DMRS port 0 and 1 are multiplexed in CDM group #0. The CDM group #0 is repeated twice, one being in RE #0 and #1 and the other one being in RE #6 and #7 (e.g., port 0 and port1 are multiplexed in RE #0 and RE #1 in the CDM manner, and port 0 and port 1 are also multiplexed in RE #6 and RE #7 in the CDM manner). Six DMRS ports can be supported in the case of one DMRS symbol, and the density of each DMRS port is 4 REs per Physical Resource Block (PRB) per symbol.

Figure 1B:
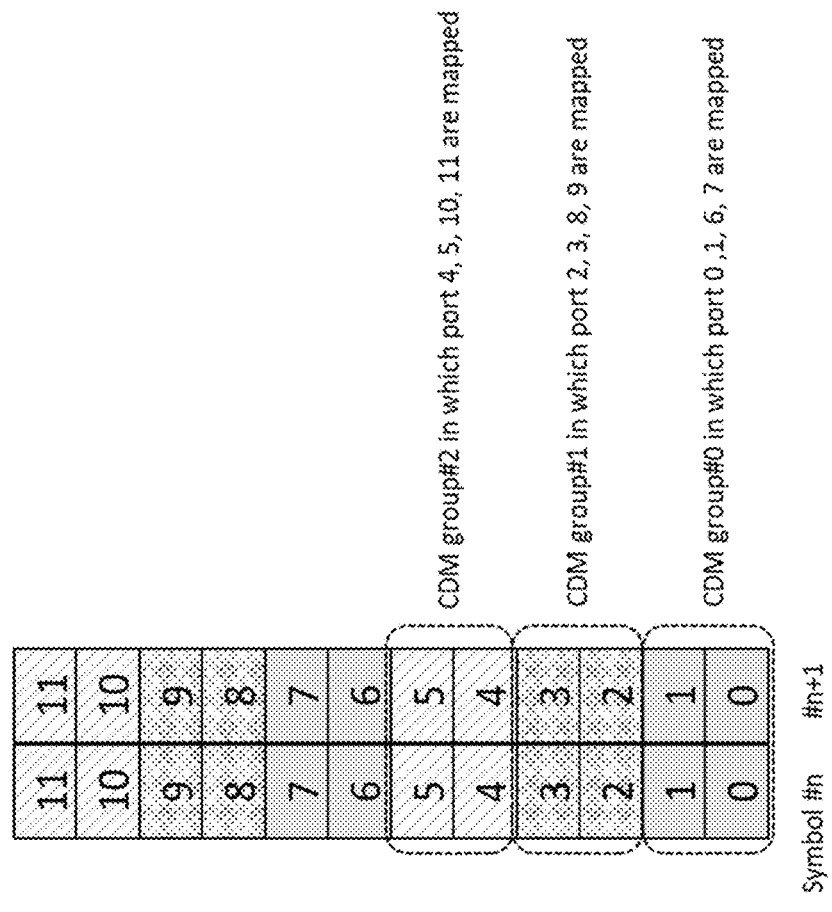
FIG. 1B illustrates an example type2 DMRS with two front-loaded DMRS symbols.

FIG. 1B illustrates an example type2 DMRS with two front-loaded DMRS symbols. Two DMRS symbols (also referred to as the two front-loaded DMRS symbols) are configured by the RRC signaling or indicated by the DCI signaling. Four adjacent REs form one DMRS CDM group. In this specific example, DMRS port 0, 1, 6 and 7 are multiplexed in CDM group #0 in the CDM manner, and the CDM group #0 is repeated twice. Twelve DMRS ports are supported in the case of two DMRS symbols, and the density of each DMRS port is 8 REs per PRB per two symbols.

Figure 1C:
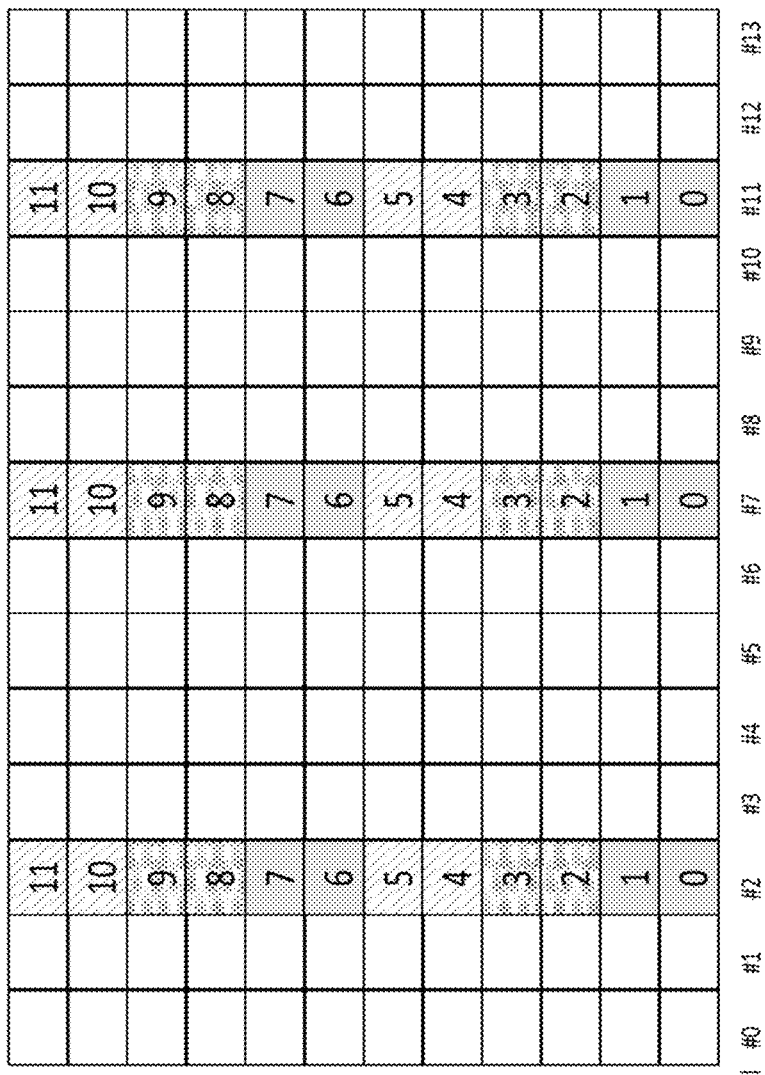
FIG. 1C illustrates another example DMRS with three DMRS symbols.

FIG. 1C illustrates another example DMRS with three DMRS symbols. In some embodiments, one front loaded DMRS symbol can be configured in a slot, and one or more additional DMRS symbols (e.g., one or two DMRS symbols) can be configured.

With the advance of wireless communication, there exists a need to support more DMRS ports, along with other techniques, to improve channel demodulation performance and provide reliable, robust communications. In uplink transmission from the User Equipment (UE) to the base station, for example, frequency hopping is one of the solutions to address poor channel condition in certain frequency bands by avoiding the impairment for the majority of the data. This patent document discloses techniques that can be implemented in various embodiments to enable the use of additional DMRS ports for different types of DMRS. The disclosed techniques are applicable to scenarios in which frequency hopping is enabled, either across multiple slots (also known as inter-slot frequency hopping) or within a single slot (also known as intra-slot frequency hopping), thereby providing demodulation enhancement while minimizing signal impairment due to channel condition changes.

Figure 2A:
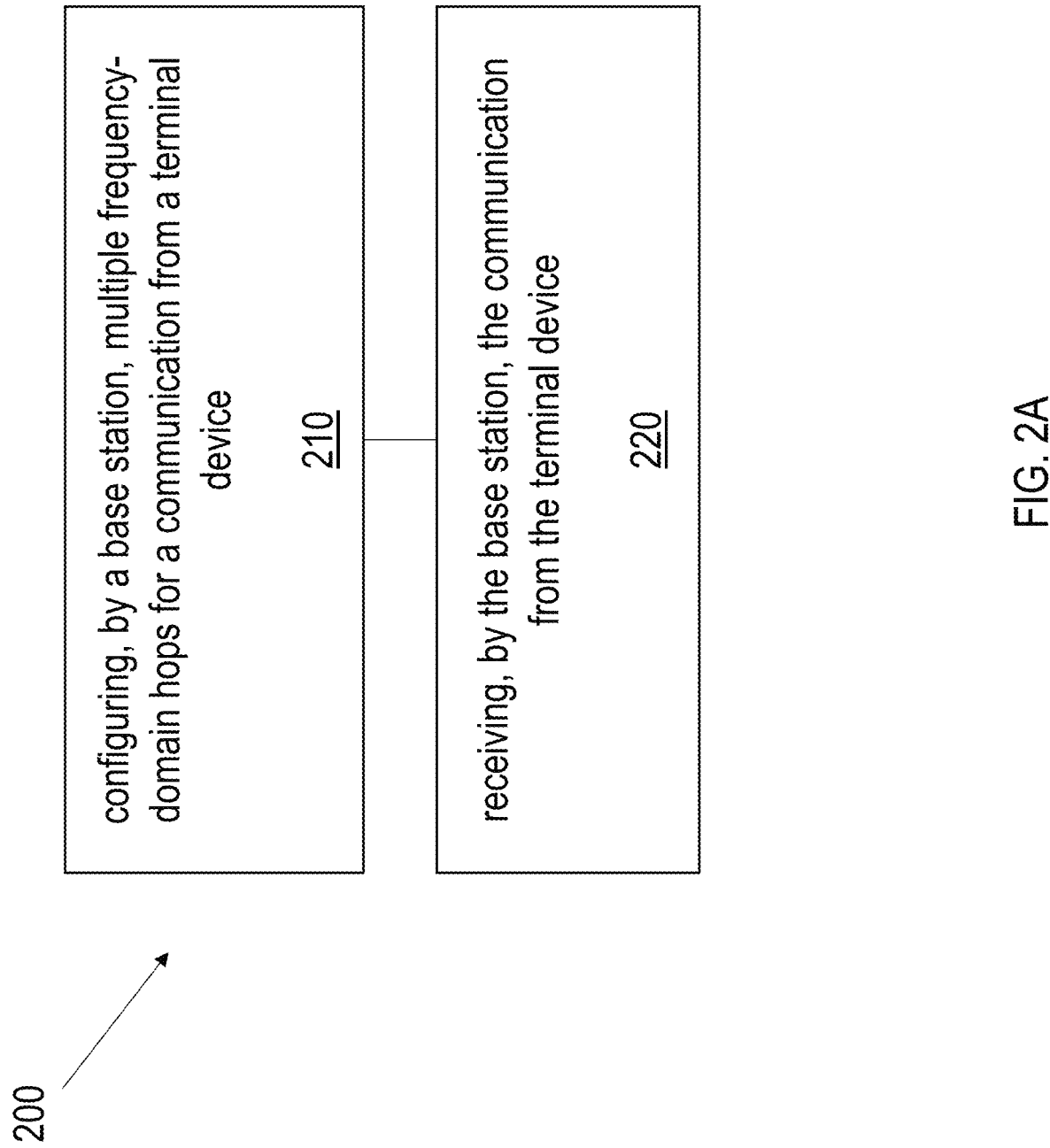
FIG. 2A illustrates a method for wireless communication in accordance with one or more embodiments of the present technology.

FIG. 2A illustrates a method for wireless communication in accordance with one or more embodiments of the present technology. The method 200 includes, at operation 210, configuring, by a base station, multiple frequency-domain hops for a communication from a terminal device. The method 200 includes, at operation 220, receiving, by the base station, the communication from the terminal device. Time-domain orthogonal cover coding (OCC) is selectively applied to one or more non-continuous symbols that carry the DMRS in at least one of the multiple frequency-domain hops based on a characteristic of a Demodulation Reference Signal (DMRS).

Figure 2B:
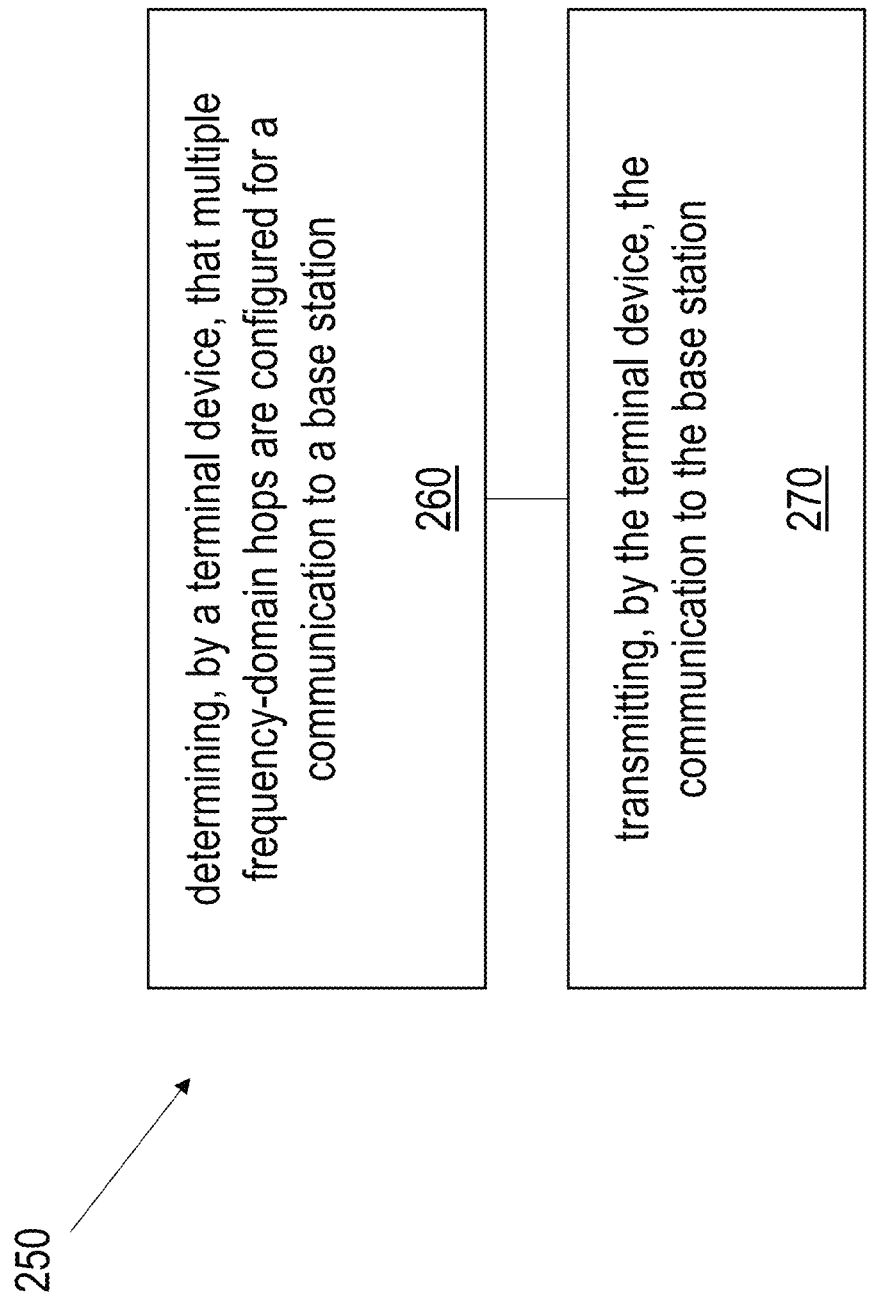
FIG. 2B illustrates another method for wireless communication in accordance with one or more embodiments of the present technology.

FIG. 2B illustrates a method for wireless communication in accordance with one or more embodiments of the present technology. The method 250 includes, at operation 260, determining, by a terminal device, that multiple frequency-domain hops are configured for a communication to a base station. The method 250 also includes, at operation 270, transmitting, by the terminal device, the communication to the base station. Time-domain orthogonal cover coding (OCC) is selectively applied to one or more non-continuous symbols that carry the DMRS in at least one of the multiple frequency-domain hops based on a characteristic of a Demodulation Reference Signal (DMRS).

In some embodiments, the multiple frequency-domain hops are configured by at least one of intra-slot frequency hopping (frequency hopping within a slot) or inter-slot frequency hopping (frequency hopping across multiple slots).

In some embodiments, the characteristic of the DMRS comprises that the DMRS is carried in a single symbol in a frequency-domain hop. The time-domain OCC is disabled in the frequency-domain hop in response to the single symbol carrying the DMRS in the frequency-domain hop. In some embodiments, the time-domain OCC is disabled in all the multiple frequency-domain hops of the slot in response to the single symbol carrying the DMRS in the frequency-domain hop. In some embodiments, the DMRS associated with the time-domain OCC of [1, 1] is applied in the frequency-domain hop in response to the single symbol carrying the DMRS in the frequency-domain hop. In some embodiments, a port index of an antenna port associated with the DMRS is less than a value of X in response to the single symbol carrying the DMRS in the frequency-domain hop (e.g., only legacy DMRS mapping is used). X is equal to 4 for type 1 DMRS, and wherein X is equal to 6 for type 2 DMRS. In some embodiments, the time-domain OCC is applied in the slot across at least two of the multiple frequency-domain hops. Frequency-domain OCC can also be applied to symbols in the slot that carry the DMRS, where a length of the frequency-domain OCC is 2 or 4.

In some embodiments, the characteristic of the DMRS comprises that the DMRS is carried in at least two symbols in a frequency-domain hop. The time-domain OCC is applied in the frequency-domain hop in response to the at least two symbols carrying the DMRS in the frequency-domain hop. In some embodiments, the time-domain OCC is applied in the slot in response to the at least two symbols carrying the DMRS in each frequency-domain hop.

In some embodiments, the characteristic of the DMRS comprises one or more configuration parameters of the DMRS. The one or more configuration parameters includes at least one of (1) a duration between a first symbol of a slot that carries the DMRS and a last symbol of the slot that carries the DMRS, (2) a duration of each frequency-domain hop, or (3) a position for additional one or more DMRS symbols.

In some embodiments, the communication comprises at least five symbols in each hop. In some embodiments, the time-domain OCC is enabled based on at least one of: a Physical Resource Group (PRG), a set of PRGs, or a Physical Resource Block (PRB).

Some examples of the disclosed techniques are further described below. It is noted that, for simplicity of the descriptions, the discussion below focuses on the scenarios of intra-slot frequency hopping, particularly intra-slot frequency hopping with two hops. The disclosed techniques, however, can be similarly applied to both intra-slot frequency hopping and inter-slot frequency hopping having different numbers of hops.

Embodiment 1

When intra-slot frequency hopping is configured for a communication, the communication is performed on different frequency resources in a slot. Different number of Orthogonal Frequency-Division Multiplexing (OFDM) symbols are supported for the transmission (e.g., either on the Physical Downlink Shared Channel (PDSCH) or the Physical Downlink Control Channel (PDCCH)). Different numbers of OFDM symbols can be configured for DMRS. For example, the parameter $1_d$ is used to indicate the number of OFDM symbols of each hop and can be used to determine the position of the DMRS in the communication. Table 1 shows example mapping of the mapping type, the parameter $1_d$, and the additional DMRS position(s) (if applicable) that can be used to determine the DMRS position in a transmission on the Physical Uplink Shared Channel (PUSCH).

TABLE 1

PUSCH DM-RS positions $\bar{l}$ within a slot for single-symbol DM-RS and intra-slot frequency hopping enabled.

| | DM-RS positions $\bar{l}$ | | | | | | | | | | | |
|---|---|---|---|---|---|---|---|---|---|---|---|---|
| | PUSCH mapping type A | | | | | | | PUSCH mapping type B | | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| $l_d$ in symbols | 1st hop | 2nd hop | 1st hop | 2nd hop | 1st hop | 2nd hop | 1st hop | 2nd hop | 1st hop | 2nd hop | 1st hop | 2nd hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

FIGS. 3A-3B illustrate example frequency hopping scenarios with DMRS mapping in accordance with one or more embodiments of the present technology. As shown in FIG. 3A, when $1_d$ is equal to 7 and two hops are configured in a slot, each hop is configured with seven Orthogonal Frequency Division Multiplexing (OFDM) symbols, with two symbols 301a, 301b for DMRS in each hot. FIG. 3B illustrates another example when $1_d$ is equal to 4 and two hops are configured in one slot. Each hop is configured with a 4 symbol PUSCH with one DMRS symbol 303 in each hot.

To increase the number of DMRS ports that can be supported, Time-Domain (TD) Orthogonal Cover Coding (OCC) can be applied on non-consecutive OFDM symbols, such as shown in FIG. 3A for the case of $1_d=7$. In the first hop of the slot, two DMRS OFDM symbol #2 and #6 are configured. The two OFDM symbols can be mapped to DMRS ports with time domain OCC of [1,1] or [1,-1]. Similarly, DMRS on the second hop can be mapped on the OFDM symbol #7 and #10 to enable TD-OCC on non-consecutive OFDM symbols in this hop.

In some embodiments, whether and/or how to support TD-OCC when frequency hopping is configured can be based on at least one of the following considerations:

(1) TD-OCC can be enabled based on the parameters such as $1_d$ and/or dmrs-AdditionalPosition. For example, the parameter dmrs-AdditionalPosition indicates a position for additional DMRS in the transmission. It can have four values representing various cases of non-adjacent OFDM symbols: pos0 (1+0, only one DMRS symbol supported), pos1 (1+1, two DMRS symbols supported), pos2 (1+1+1, three DMRS symbols supported), and pos3 (1+1+1+1, four DMRS symbols supported). When dmrs-AdditionalPosition is configured to be pos0, only one OFDM symbol is supported for each hop, and TD-OCC should be disabled in the slot or at least in this hop (per-hop TD-OCC usage is further discussed in Embodiment 2). When dmrs-AdditionalPosition is configured to be pos1, pos2, or pos3, different numbers of DMRS symbols are supported for different configured values of $1_d$ (see Table 1 above). According to the values of $1_d$ and dmrs-AdditionalPosition, the number of DMRS ports can be determined and whether to support TD-OCC can be determined according to these parameters.

(2) TD-OCC can be enabled based on the number of DMRS symbols per hop. For example, as shown in FIG. 3A, when $1_d=4$ and only one DMRS symbol is supported, TD-OCC is thus not enabled. As another example, as shown in Table 1, when $1_d$ is equal to 5 or 6, the mapping type is Type A, and $l_0=2$, only one DMRS symbol is configured in the first hop for pos1 (symbol position at 2) and two DMRS symbols are configured in the second hop (symbol positions as 0, 4). Correspondingly, TD-OCC is not supported for the first hop and can be used in the second hop.

(3) TD-OCC can be enabled if at least two DMRS symbols are supported in each hop. To achieve so, an alternative mapping of parameters $1_d$, mapping type, dmrs-AdditionalPosition can be provided. Table 2 shows another example mapping of the mapping type, the parameter $1_d$, and the additional DMRS position(s) (if applicable) to determine the DMRS position. As shown in Table 2, when $1_d$ is equal to 5 or 6, the mapping type is Type A, and $l_0=2$, two DMRS symbols are configured in the first hop for pos1 (symbol positions at 2, 4) and two DMRS symbols are configured in the second hop (symbol positions as 0, 4). Correspondingly, TD-OCC is enabled for both the first hop and the second hop.

TABLE 2

PUSCH DM-RS positions within a slot for single-symbol DM-RS and intra-slot frequency hopping enabled.

| | DM-RS positions $\bar{l}$ | | | | | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| $l_d$ in symbols | 1st hop | 2nd hop | 1st hop | 2nd hop | 1st hop | 2nd hop | 1st hop | 2nd hop | 1st hop | 2nd hop | 1st hop | 2nd hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2, 4 | 0, 4 | 3 | 0 | 3, 4 | 0, 4 | 0 | 0 | 0, 4 | 0, 4 |
| 7 | 2 | 0 | 2, 6 | 0, 4 | 3 | 0 | 3, 4 | 0, 4 | 0 | 0 | 0, 4 | 0, 4 |

Figure 4A:
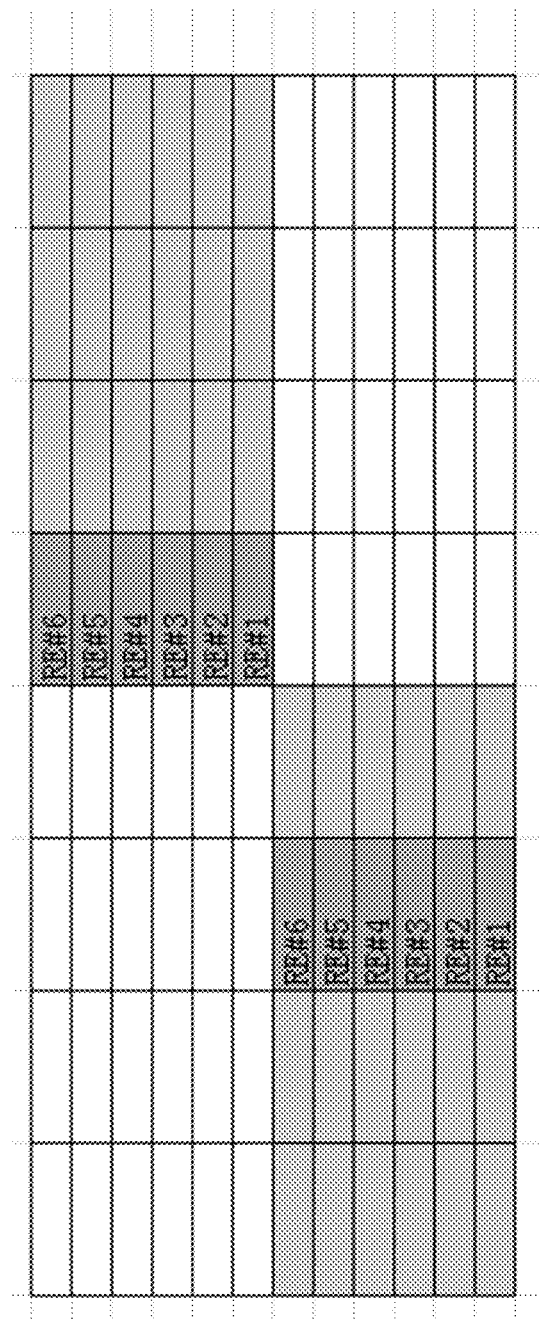
FIG. 4A illustrates an example cross-hop application of Time Domain (TD) Orthogonal Cover Coding (OCC) in accordance with one or more embodiments of the present technology.

(4) Usage of TD-OCC can be across different hops. FIG. 4A illustrates an example usage of TD-OCC cross two hops in accordance with one or more embodiments of the present technology. As shown in FIG. 4A, only one DMRS symbol is configured in each hop. Therefore, TD-OCC cannot be enabled on a per-hop basis. However, TD-OCC can be supported in the slot on the two DMRS symbols across the two hops.

TD-OCC is often used on different OFDM symbols in the time domain but the same resource elements in the frequency domain. Usage of TD-OCC across different hops can be determined based on the proximity between the two or more DMRS symbols in the time-domain. When the DMRS symbols are far away from each other, the channel states on the resource elements can vary, leading to undesirable performance. When the DMRS symbols are close to each other in the time domain, however, the channel states on these resource elements are often similar, making TD-OCC more desirable to provide more DMRS ports.

When TD-OCC is used across hops, TD-OCC needs to be applied to different resource elements in the frequency domain. Usage of TD-OCC across different hops can be determined based on the values of resource element indices or the relative values (e.g., offsets) between the resource element indices.

Figure 4B:
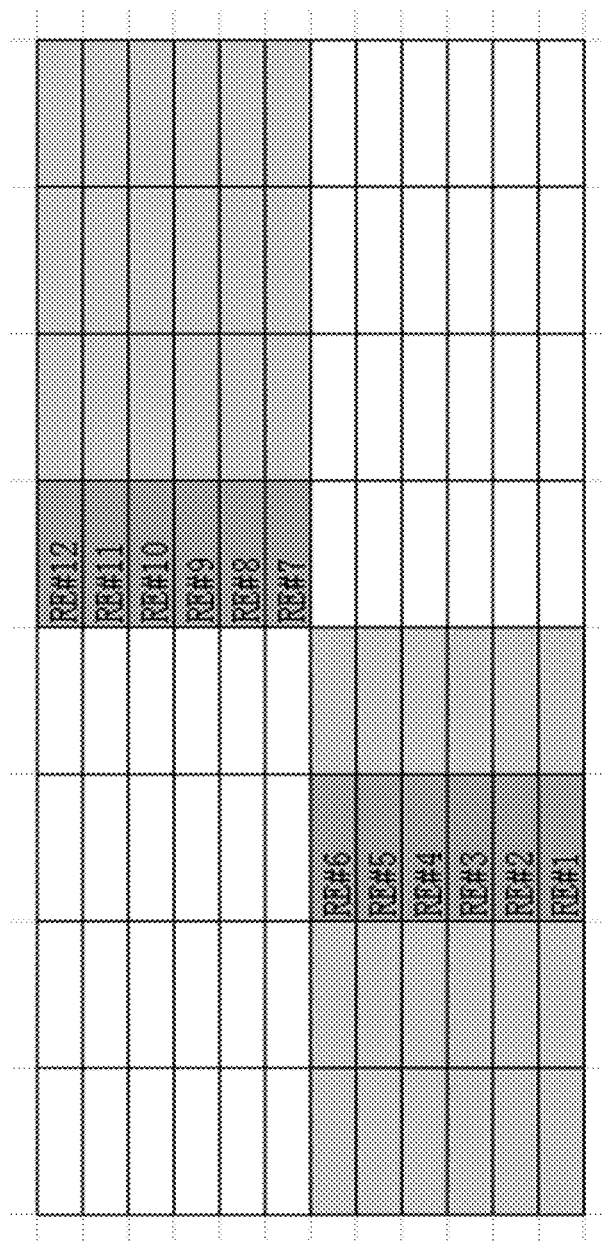
FIG. 4B illustrates another example cross-hop application of TD-OCC in accordance with one or more embodiments of the present technology.

For example, as shown in FIG. 4A, the two hops are mapped onto resource elements having the same indices in different PRBs. In such cases, TD-OCC can be applied to the resource(s) with the same index(es), e.g., RE #1 of the third and fifth OFDM symbol in the slot. As another example, shown in FIG. 4B, the two hops are mapped onto resource elements having different indices in the same or different PRBs. The first hop is mapped from RE #1 to RE #6, while the second hop is mapped from RE #7 to RE #12. In such cases, TD-OCC can be applied based on the relative positions of the REs. Given that the relative positions of RE #7 to RE #12 correspond to RE #1 to RE #6, TD-OCC across the two tops can be applied, e.g., to RE #1 in the first hop and RE #7 in the second hop.

(5) TD-OCC can be used on non-consecutive OFDM symbols of DMRS when frequency hopping is not configured. In some scenarios, when frequency hopping is configured, the positions of the DMRS OFDM symbols make it undesirable to use TD-OCC (e.g., only one DMRS OFDM symbol in each hop, and the DMRS OFDM symbols are far apart across different hops). To simplify TD-OCC usage determination, a predefined rule can specify that TD-OCC with non-consecutive DMRS symbols and frequency hopping are not enabled or configured simultaneously.

Embodiment 2

In some embodiments, usage of TD-OCC is on a per-hop basis: more DMRS ports can be enabled in a hop if TD-OCC is applicable, and in hops where TD-OCC is not applicable, DMRS mapping can be skipped, or legacy mapping can be performed to support legacy number of DMRS ports.

Figure 5:
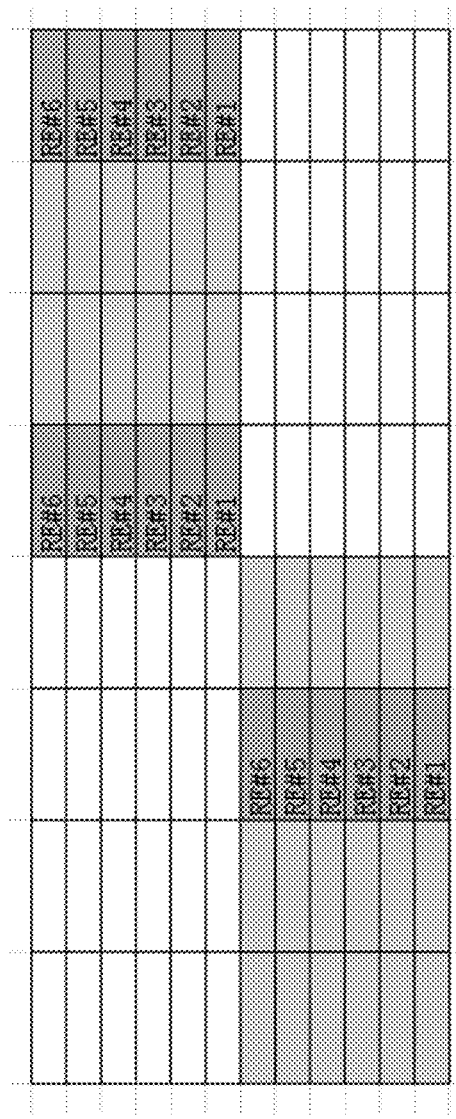
FIG. 5 illustrates an example per-hop TD-OCC usage in accordance with one or more embodiments of the present technology.

FIG. 5 illustrates an example per-hop TD-OCC usage in accordance with one or more embodiments of the present technology. The communication includes two hops: the first hop having one DMRS symbol and the second hop having two DMRS symbols. TD-OCC is only applied on the hop with the two DMRS symbols to enable more DMRS ports. In the hop that only one DRMS symbol is supported, two alternatives can be considered.

The first alternative is to not map DMRS on the hop with only one DMRS symbol. The demodulation results of the other hop can be used for the communication. If both hops are configured with only one DMRS symbol, TD-OCC can be disabled in both hops.

The second alternative is to use legacy mapping to map legacy DMRS ports on the only one DMRS symbol of the hop. For example, when TD-OCC is enabled, DMRS port #0 and #8 are mapped for the transmission. DMRS port #0 is associated with TD-OCC of [1,1] and DMRS port #8 is associated with TD-OCC of [1,−1]. For the second hop with two DMRS symbols, TD-OCC can be applied to support DMRS port #0 and DMRS port #8. For the first hop with only one DMRS symbol, DMRS port #0 with TD-OCC of [1,1] (the legacy DMRS port) can be mapped to the DMRS symbol. The DMRS port #8 with TD-OCC of [1,−1] is not mapped onto the DMRS symbol and the TD-OCC is not used in this hop.

Embodiment 3

In some embodiments, a combination of TD-OCC and Frequency Domain (FD) OCC can be applicable on the DMRS symbols.

FD-OCC can be applied in a communication or transmission regardless of whether TD-OCC is applicable. For example, two REs can be used to map DMRS with FD-OCC configured. A DMRS port can be associated with FD-OCC of [1,1] or [1,−1]. DMRS ports that are mapped on different symbols having the same resource element index in the frequency domain use the same OCC.

Figure 6A:
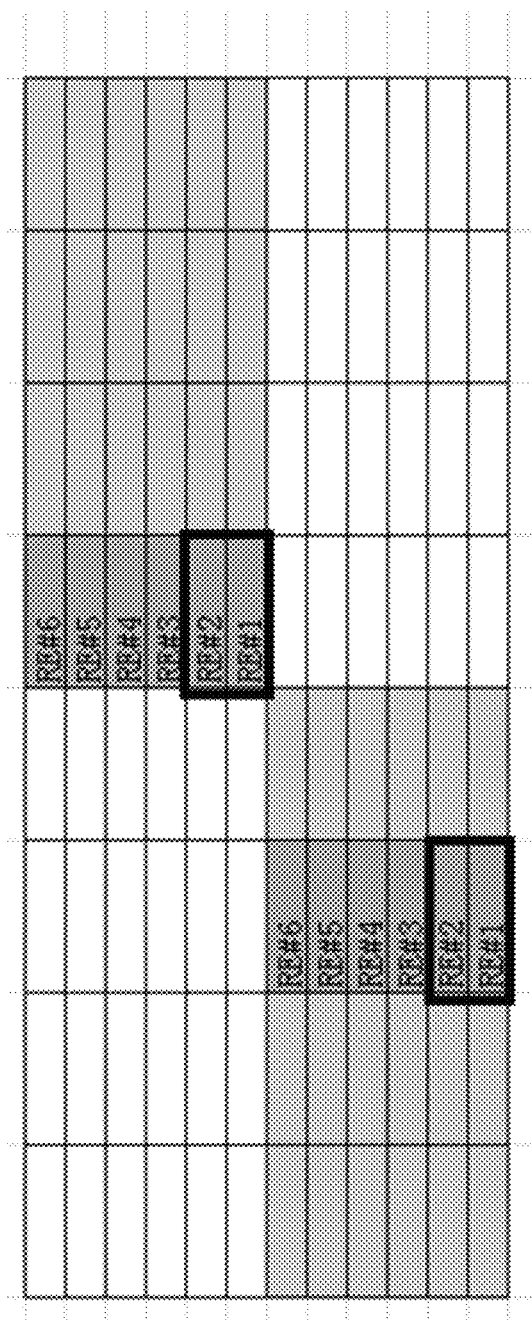
FIG. 6A illustrates an example of a combination TD-OCC with Frequency Domain (FD) OCC in accordance with one or more embodiments of the present technology.

As discussed in Embodiment 1, when TD-OCC is used across different hops, different resource elements in the frequency domain can be used to map the DMRS ports with TD-OCC. The DMRS port with TD-OCC on different OFDM symbols is mapped on different resource elements in the frequency domain, so the FD-OCC can be determined based on one of the following:

(1) FD-OCC with length 2, i.e.[1,1] or [1,−1]. As shown in FIG. 6A, the REs on each hop is mapped to DMRS with FD-OCC respectively. With combined FD-OCC and TD-OCC, in each CDM group, eight DMRS ports can be supported with TD-OCC having a length of two and FD-OCC having a length of two. With three CDM groups, a total number of 24 DMRS ports can be supported.

Figure 6B:
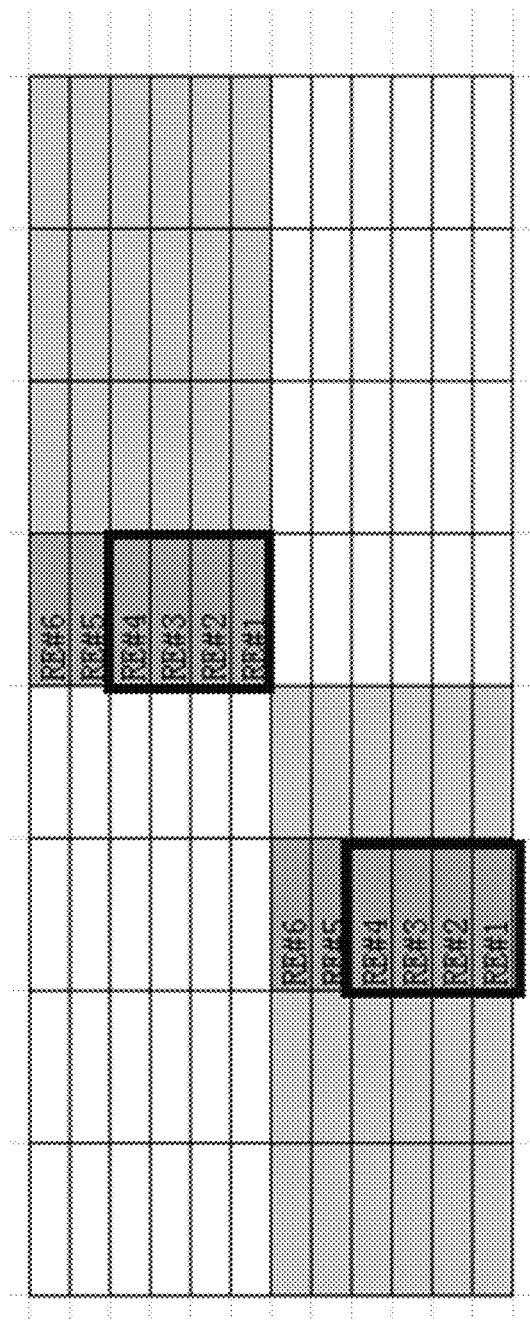
FIG. 6B illustrates another example of a combination TD-OCC with FD-OCC in accordance with one or more embodiments of the present technology.

(2) FD-OCC with length 4, i.e.[1,1,1,1] or [1,1,−1,−1], or [1,−1,1,−1] or [1,−1,−1,1]. One CDM group is mapped on four different REs in the frequency domain. As shown in FIG. 6B, a FD-OCC with length 4 can be used for the four REs. In this CDM group, a TD-OCC with length 2 and FD-OCC with length 4 is supported.

In some embodiments, one CDM group with TD-OCC of length 2 and FD-OCC with length 4 is supported so that up to eight DMRS ports are supported. In some cases, however, only 4 DMRS may be needed. How to select the four DMRS ports from the eight DMRS ports can be based on one of the following:

(1) TD-OCC is applied, and two FD-OCC should be selected from the four FD-OCC, e.g. [1,1,1,1] and [1,1,−1,−1], to determine the four DMRS ports.

(2) TD-OCC and FD-OCC are selected from eight combinations. For example, for high-speed communications, channel conditions in the time-domain may change rapidly, resulting in undesirable demodulation results using TD-OCC. Therefore, for high-speed communications, TD-OCC can be disabled and FD-OCC of length four can be selected to determine the four DMRS ports. For communications with large delay spread, on the other hand, channel conditions in the frequency domain may undergo vast changes, resulting in impact on FD-OCC performance. For these communications, TD-OCC applied, and two FD-OCC should be selected from the four FD-OCC, e.g. [1,1,1,1] and [1,1,−1,−1], to determine the four DMRS ports.

In some embodiments, new DMRS port mapping mechanism is enabled (e.g., DMRS with FD-OCC length of 4 or 6, DMRS with TD-OCC on non-continuous OFDM symbols, or more than 2 DMRS CDM groups are supported on one OFDM symbol). The downlink or uplink transmission is mapped on the resources as one or more Physical Resource Groups (PRGs) or one or more PRG sets. For example, DMRS ports mapped with FD-OCC length greater than 2 (e.g., 4 or 6) and and legacy DMRS ports with FD-OCC of length 2 can be enabled or configured in different PRGs. Whether the FD-OCC having a length of 2 or greater than 2 can be determined or indicated based on the number of PRBs in one PRG. If the number of PRBs in one PRG is an even number, the FD-OCC can be mapped or configured with a length greater than 2 (e.g., 4 or 6). If the number of PRBs in one PRG is an odd number, the length of the FD-OCC is 2. For type-1 DMRS, six REs are used to map with the same CDM group index. Currently, CDM group #0 and 1 are supported on one OFDM symbol for type 1 DMRS, and RE #0,2,4,6,8,10 are used to map CDM group 0. If FD-OCC with length 4 is supported, four REs can be used for one CDM group. If two continuous PRBs are used to map type-1 DMRS, a total number of 12 REs are supported on the two PRBs. FD-OCC with length 4 can be used across the two PRBs (e.g., the first CDM group #0 on REs #0,2,4,6 of the first PRB, the second CDM group #0 on REs #8,10 of the first RPB and REs #0,2 of the second PRB, and the third CDM group #0 on REs #4,6,8,10 of the second PRB). Therefore, if the scheduled number of PRBs in one PRG is even, FD-OCC with length 4 can be used. Otherwise, if the scheduled number of PRBs in one PRG is odd, six REs can not be used to map DMRS with FD-OCC of length 4, so the PRBs in one PRG with an odd number of PRBs should be used to map the DMRS with FD-OCC of length 2. This is mainly used for type-1 DMRS. Different length of FD-OCC can be supported in different PRGs.

In some embodiments, DMRS are mapped on different OFDM symbols for Time Division Multiplexing (TDM) based transmission in both uplink and downlink directions. FIG. 7A illustrates an example mapping of TDM based DMRS to OFDM symbols in accordance with one or more embodiments of the present technology. Two or three CDM groups can be mapped onto certain OFDM symbols and another two or three CDM groups can be mapped onto the remaining OFDM symbols. To ensure that TDM can be used for all DMRS ports, the number of OFDM symbols for DMRS mapping in one slot can be even (e.g., 2 or 4 DMRS symbols). When three DMRS symbols are supported in a slot, two of the three DMRS symbols can be mapped as TDM based transmission. The remaining DMRS symbols can be mapped as a repetition of one of the TDM based OFDM symbol (e.g., the first DMRS symbol). When four DMRS symbols are supported in a slot, each two of the four symbols can be mapped as the TDM based transmission. FIG. 7B illustrates another example mapping of TDM based DMRS to OFDM symbols in accordance with one or more embodiments of the present technology. In some embodiments, a first TDM based DMRS is mapped to the first two symbols, and a second TDM based DMRS is mapped to the remaining two symbols. In some embodiments, a first TDM based DMRS is mapped to the first and the third symbols, and a second TDM based DMRS is mapped to the second and the fourth symbols.

For TDM based DMRS mapping, different CDM groups can be mapped on different OFDM symbols. In some embodiments, two or three DMRS CDM groups are supported in one OFDM symbol. Correspondingly, the power ratio of DMRS and PUSCH/PDSCH is based on each OFDM symbol. The number of CDM groups without data can be calculated based on one OFDM symbol. For example, for type 1 DMRS, CDM group #0,1 are mapped on one or more OFDM symbols and CDM group #2,3 are mapped on other one or more OFDM symbols. The power ratio can be calculated based on the number of CDM groups on the same OFDM symbols. Table 3 shows an example ratio of Energy Per Resource Element (EPRE) in accordance with one or more embodiments of the present technology.

TABLE 3

Example Ratio of PUSCH EPRE to DM-RS EPRE

| Number of DM-RS CDM groups without data on the same OFDM symbols | DM-RS configuration type 1 | DM-RS configuration type 2 |
|---|---|---|
| 1 | 0 dB | 0 dB |
| 2 | −3 dB | −3 dB |
| 3 | — | −4.77 dB |

In some embodiments, the power of CDM group can be boosted according to the total number of CDM group without data. For example, the number of DMRS CDM groups without data is indicate based on the CDM groups of all the DMRS symbols in one slot. The power can correspondingly be boosted based on the indicated number of CDM groups without data for all the CDM groups in the slot. Table 4 shows an example ratio of EPRE in accordance with one or more embodiments of the present technology.

TABLE 4

The ratio of PDSCH EPRE to DM-RS EPRE

| Number of DM-RS CDM groups without data | DM-RS configuration type 1 | DM-RS configuration type 2 |
|---|---|---|
| 1 | 0 dB | 0 dB |
| 2 | −3 dB | −3 dB |
| 3 | −4.77 dB- | −4.77 dB |
| 4 | −6 dB | −6 dB |
| 5 | — | −7.77 dB |
| 6 | — | −9 dB |

Figure 8:
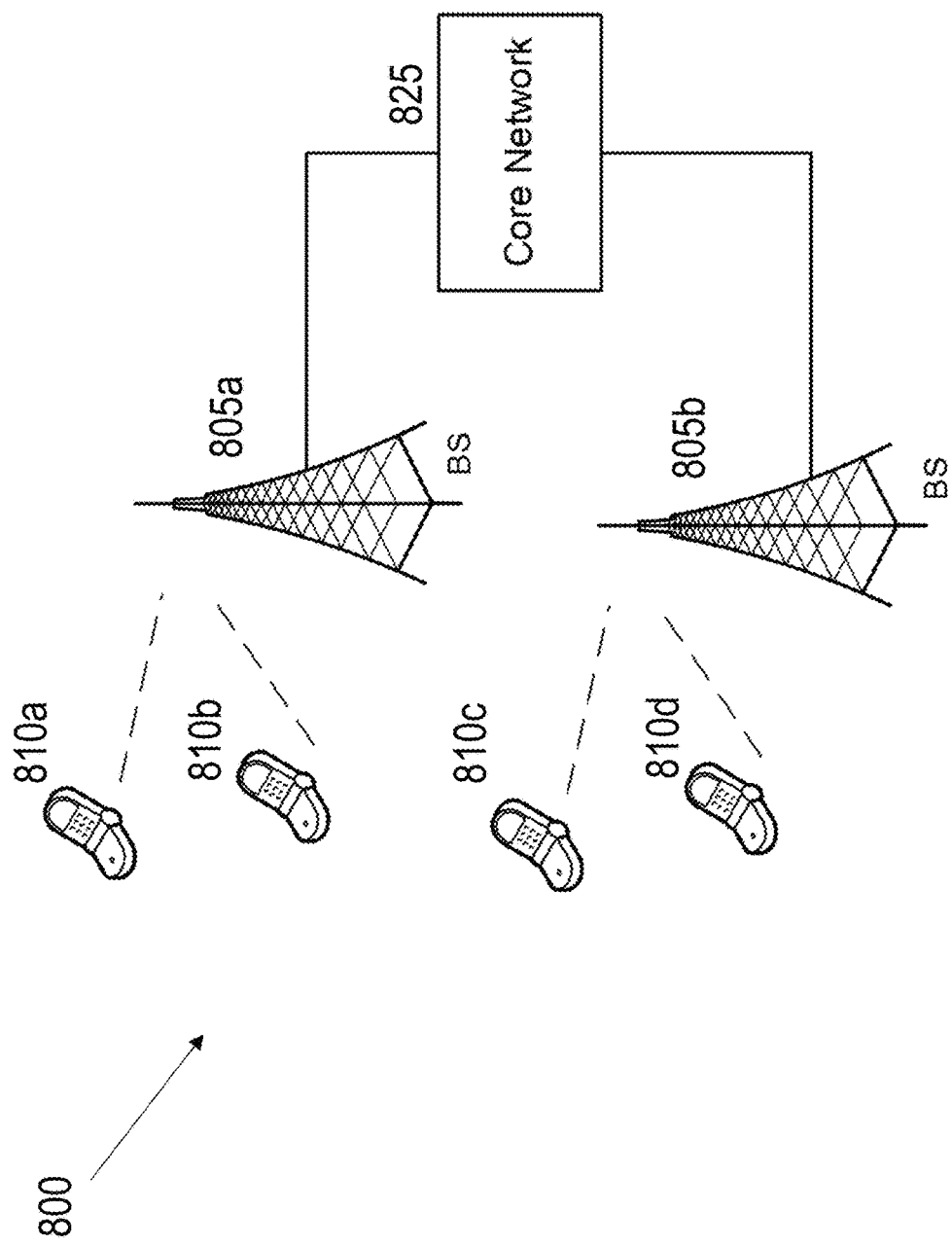
FIG. 8 shows an example of a wireless communication system where techniques in accordance with one or more embodiments of the present technology can be applied.

FIG. 8 shows an example of a wireless communication system 800 where techniques in accordance with one or more embodiments of the present technology can be applied. A wireless communication system 800 can include one or more base stations (BSs) 805a, 805b, one or more wireless devices (or UEs) 810a, 810b, 810c, 810d, and a core network 825. A base station 805a, 805b can provide wireless service to user devices 810a, 810b, 810c and 810d in one or more wireless sectors. In some implementations, a base station 805a, 805b includes directional antennas to produce two or more directional beams to provide wireless coverage in different sectors. The core network 825 can communicate with one or more base stations 805a, 805b. The core network 825 provides connectivity with other wireless communication systems and wired communication systems. The core network may include one or more service subscription databases to store information related to the subscribed user devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the field according to the deployment scenario. The user devices 810a, 810b, 810c, and 810d can support multiple different radio access technologies. The techniques and embodiments described in the present document may be implemented by the base stations of wireless devices described in the present document.

Figure 9:
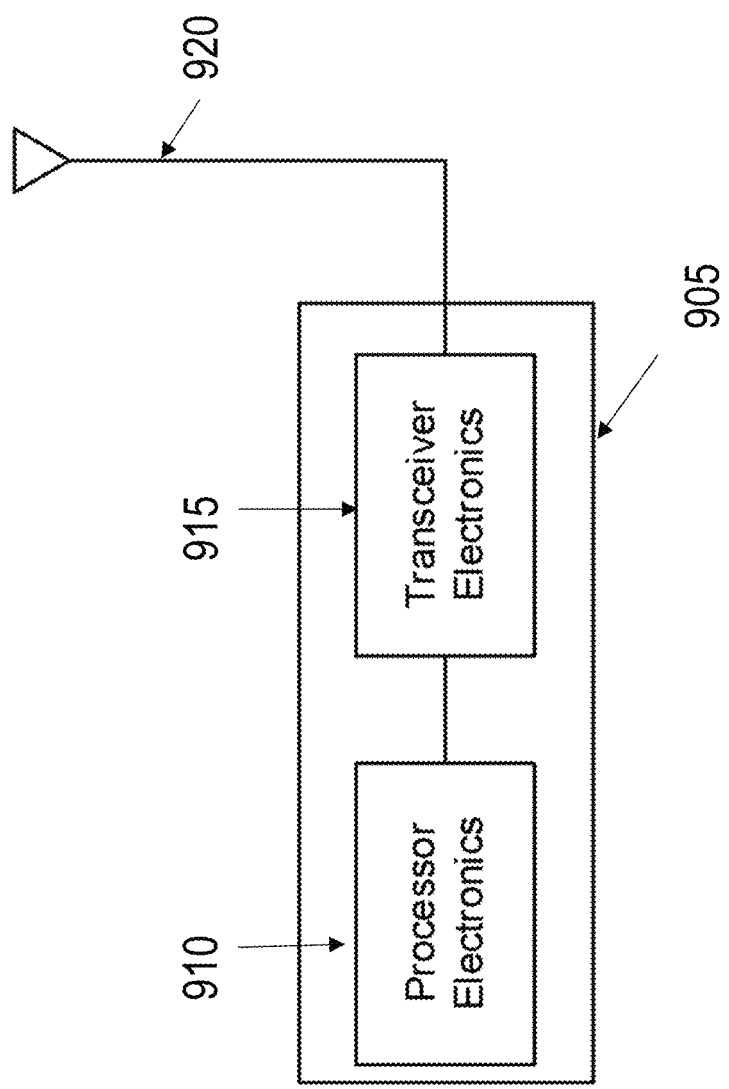
FIG. 9 is a block diagram representation of a portion of a radio station in accordance with one or more embodiments of the present technology can be applied.

FIG. 9 is a block diagram representation of a portion of a radio station in accordance with one or more embodiments of the present technology can be applied. A radio station 905 such as a network node, a base station, or a wireless device (or a user device, UE) can include processor electronics 910 such as a microprocessor that implements one or more of the wireless techniques presented in this document. The radio station 905 can include transceiver electronics 915 to send and/or receive wireless signals over one or more communication interfaces such as antenna 920. The radio station 905 can include other communication interfaces for transmitting and receiving data. Radio station 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the radio station 905. In some embodiments, the radio station 905 may be configured to perform the methods described herein.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
configuring, by a base station, multiple frequency-domain hops for a communication from a terminal device, wherein the multiple frequency-domain hops are configured by at least one of intra-slot frequency hopping or inter-slot frequency hopping; and
receiving, by the base station, the communication from the terminal device, wherein time-domain orthogonal cover coding (OCC) is selectively applied, based on a characteristic of a Demodulation Reference Signal (DMRS) comprising a number of DMRS symbols per hop, to one or more non-continuous symbols that carry the DMRS in at least one of the multiple frequency-domain hops,
wherein, the time-domain OCC is not applied on the hop with a single DMRS symbol, and is applied on a hop with more than one DMRS symbol.

2. The method of claim 1, wherein the time-domain OCC is disabled upon the characteristic of the DMRS indicating that the DMRS is carried in a single symbol in each frequency-domain hop or all frequency-domain hops.

3. The method of claim 1, wherein the characteristic of the DMRS comprises that the DMRS is carried in at least two symbols in a frequency-domain hop, and wherein the time-domain OCC is applied in the frequency-domain hop in response to the at least two symbols carrying the DMRS in the frequency-domain hop.

4. The method of claim 1, wherein the characteristic of the DMRS comprises that the DMRS is carried in a single symbol in each frequency-domain hop, and wherein the time-domain OCC is applied in a slot across at least two of the multiple frequency-domain hops, the method further comprising:
applying frequency-domain OCC to symbols in the slot that carry the DMRS, wherein a length of the frequency-domain OCC is 2 or 4.

5. The method of claim 1, wherein the characteristic of the DMRS comprises one or more configuration parameters of the DMRS, the one or more configuration parameters comprising at least one of (1) a duration between a first symbol of a slot that carries the DMRS and a last symbol of the slot that carries the DMRS, (2) a duration of each frequency-domain hop, or (3) a position for additional one or more DMRS symbols.

6. A method for wireless communication, comprising:
determining, by a terminal device, that multiple frequency-domain hops are configured for a communication to a base station, wherein the multiple frequency-domain hops are configured by at least one of intra-slot frequency hopping or inter-slot frequency hopping; and
transmitting, by the terminal device, the communication to the base station, wherein time-domain orthogonal cover coding (OCC) is selectively applied, based on a characteristic of a Demodulation Reference Signal (DMRS) comprising a number of DMRS symbols per hop, to one or more non-continuous symbols that carry the DMRS in at least one of the multiple frequency-domain hops,
wherein, the time-domain OCC is not applied on the hop with a single DMRS symbol, and is applied on a hop with more than one DMRS symbol.

7. The method of claim 6, wherein the time-domain OCC is disabled upon the characteristic of the DMRS indicating that the DMRS is carried in a single symbol in each frequency-domain hop or all frequency-domain hops.

8. The method of claim 6, wherein the characteristic of the DMRS comprises that the DMRS is carried in at least two symbols in a frequency-domain hop, and wherein the time-domain OCC is applied in the frequency-domain hop in response to the at least two symbols carrying the DMRS in the frequency-domain hop.

9. The method of claim 6, wherein the characteristic of the DMRS comprises that the DMRS is carried in a single symbol in each frequency-domain hop, and wherein the time-domain OCC is applied in a slot across at least two of the multiple frequency-domain hops, the method further comprising:
applying frequency-domain OCC to symbols in the slot that carry the DMRS, wherein a length of the frequency-domain OCC is 2 or 4.

10. The method of claim 6, wherein the characteristic of the DMRS comprises one or more configuration parameters of the DMRS, the one or more configuration parameters comprising at least one of (1) a duration between a first symbol of a slot that carries the DMRS and a last symbol of the slot that carries the DMRS, (2) a duration of each frequency-domain hop, or (3) a position for additional one or more DMRS symbols.

11. A communication apparatus, comprising at least one processor configured to:
configure multiple frequency-domain hops for a communication from a terminal device, wherein the multiple frequency-domain hops are configured by at least one of intra-slot frequency hopping or inter-slot frequency hopping; and
receive the communication from the terminal device, wherein time-domain orthogonal cover coding (OCC) is selectively applied, based on a characteristic of a Demodulation Reference Signal (DMRS) comprising a number of DMRS symbols per hop, to one or more non-continuous symbols that carry the DMRS in at least one of the multiple frequency-domain hop,
wherein, the time-domain OCC is not applied on the hop with a single DMRS symbol, and is applied on a hop with more than one DMRS symbol.

12. The apparatus of claim 11, wherein the time-domain OCC is disabled upon the characteristic of the DMRS indicating that the DMRS is carried in a single symbol in each frequency-domain hop or all frequency-domain hops.

13. The apparatus of claim 11, wherein the characteristic of the DMRS comprises that the DMRS is carried in at least two symbols in a frequency-domain hop, and wherein the time-domain OCC is applied in the frequency-domain hop in response to the at least two symbols carrying the DMRS in the frequency-domain hop.

14. The apparatus of claim 11, wherein the characteristic of the DMRS comprises that the DMRS is carried in a single symbol in each frequency-domain hop, and wherein the time-domain OCC is applied in a slot across at least two of the multiple frequency-domain hops, the at least one processor configured to:
apply frequency-domain OCC to symbols in the slot that carry the DMRS, wherein a length of the frequency-domain OCC is 2 or 4.

15. The apparatus of claim 11, wherein the characteristic of the DMRS comprises one or more configuration parameters of the DMRS, the one or more configuration parameters comprising at least one of (1) a duration between a first symbol of a slot that carries the DMRS and a last symbol of the slot that carries the DMRS, (2) a duration of each frequency-domain hop, or (3) a position for additional one or more DMRS symbols.

16. A communication apparatus, comprising at least one processor configured to:
determine that multiple frequency-domain hops are configured for a communication to a base station, wherein the multiple frequency-domain hops are configured by at least one of intra-slot frequency hopping or inter-slot frequency hopping; and
transmit the communication to the base station, wherein time-domain orthogonal cover coding (OCC) is selectively applied, based on a characteristic of a Demodulation Reference Signal (DMRS) comprising a number of DMRS symbols per hop, to one or more non-continuous symbols that carry the DMRS in at least one of the multiple frequency-domain hops,
wherein, the time-domain OCC is not applied on the hop with a single DMRS symbol, and is applied on a hop with more than one DMRS symbol.

17. The apparatus of claim 16, wherein the time-domain OCC is disabled upon the characteristic of the DMRS indicating that the DMRS is carried in a single symbol in each frequency-domain hop or all frequency-domain hops.

18. The apparatus of claim 16, wherein the characteristic of the DMRS comprises that the DMRS is carried in at least two symbols in a frequency-domain hop, and wherein the time-domain OCC is applied in the frequency-domain hop in response to the at least two symbols carrying the DMRS in the frequency-domain hop.

19. The apparatus of claim 16, wherein the characteristic of the DMRS comprises that the DMRS is carried in a single symbol in each frequency-domain hop, and wherein the time-domain OCC is applied in a slot across at least two of the multiple frequency-domain hops, the at least one processor configured to:
apply frequency-domain OCC to symbols in the slot that carry the DMRS, wherein a length of the frequency-domain OCC is 2 or 4.

20. The apparatus of claim 16, wherein the characteristic of the DMRS comprises one or more configuration parameters of the DMRS, the one or more configuration parameters comprising at least one of (1) a duration between a first symbol of a slot that carries the DMRS and a last symbol of the slot that carries the DMRS, (2) a duration of each frequency-domain hop, or (3) a position for additional one or more DMRS symbols.

* * * * *